United States Patent
Liu

(10) Patent No.: US 9,334,421 B2
(45) Date of Patent: May 10, 2016

(54) METHOD AND DEVICE FOR COATING WITH POLYIMIDE SOLUTION

(71) Applicant: Shenzhen China Star Optoelectronics Technology Co., Ltd., Shenzhen, Guangdong (CN)

(72) Inventor: Ming Liu, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 463 days.

(21) Appl. No.: 13/824,386

(22) PCT Filed: Jan. 22, 2013

(86) PCT No.: PCT/CN2013/070835
§ 371 (c)(1),
(2) Date: Mar. 18, 2013

(87) PCT Pub. No.: WO2014/107921
PCT Pub. Date: Jul. 17, 2014

(65) Prior Publication Data
US 2014/0193583 A1   Jul. 10, 2014

(30) Foreign Application Priority Data
Jan. 9, 2013   (CN) .......................... 2013 1 0007617

(51) Int. Cl.
C09D 179/08 (2006.01)
C08J 7/04 (2006.01)
B32B 17/10 (2006.01)

(52) U.S. Cl.
CPC ........ C09D 179/08 (2013.01); B32B 17/10174 (2013.01); C08J 7/047 (2013.01)

(58) Field of Classification Search
CPC ...................................................... C09D 179/08
See application file for complete search history.

(56) References Cited

U.S. PATENT DOCUMENTS

| 5,275,237 A | * | 1/1994 | Rolfson | F28F 3/12 165/168 |
|---|---|---|---|---|
| 2002/0037462 A1 | * | 3/2002 | Ogata et al. | 430/30 |
| 2003/0112407 A1 | * | 6/2003 | Nakano | G02F 1/1337 349/187 |
| 2007/0181857 A1 | * | 8/2007 | Nishioka | C08L 65/00 252/500 |

* cited by examiner

Primary Examiner — Nathan T Leong

(57) ABSTRACT

A method and device for coating with polyimide solution are provided. The method includes the following steps: placing a glass substrate onto a support surface to form a face contact therebetween; heating the glass substrate to a preset coating temperature through the support surface; and coating the glass substrate with the polyimide solution. With the glass substrate heated before being coated, the polyimide solution diffusion and solvent evaporation during coating can be accelerated, which is conducive to controlling the temperature uniformity and consistency and preventing the cloud-like spots. The glass substrate in face contact with the support plate is more conducive to being fully heated, and can prevent the glass substrate from being heated non-uniformly due to the contact of the glass substrate with the supporting legs, thereby preventing the foot-like spots.

10 Claims, 3 Drawing Sheets

METHOD AND DEVICE FOR COATING WITH POLYIMIDE SOLUTION

FIELD OF THE INVENTION

The present invention relates to the field of display manufacture, particularly to a method and device for coating with polyimide solution.

BACKGROUND OF THE INVENTION

In the manufacturing process of the liquid crystal display, the polyimide (PI) solution needs to be coated onto the surface of a glass substrate, which is then dried through heating to evaporate the liquid solvent in the PI solution, leaving the solid components to form a layer of uniform film as the polyemid to make the liquid crystal molecules definite.

The common coating device with PI solution includes a heating plate, on which supporting legs are arranged for supporting the glass substrate on the heating plate which heats the air there above that then heats the glass substrate. A main problem of the device is as follows: with the supporting legs contacting the glass substrate and the heating plate at the same time, the temperature at the position in contact with the supporting legs on the glass substrate may be higher than where not in contact with the supporting legs, which results in a temperature difference and thus makes the solvent on the glass substrate evaporated at different speeds, thereby producing foot-like spots at the position corresponding to the supporting legs. There is still another problem as follows: after being coated with the PI solution, when the glass substrate is heated by the hot air between the glass substrate and the heating plate, the poor heat transfer property of gas may lead to a lower heating temperature, which makes both diffusion of the PI solution and the solvent evaporation slower, thus consuming more time. Furthermore, the airflow, due to non-visibility and instability, is very easy to make the temperature of the glass substrate non-uniform during the heat transfer process, and thus makes the solvent on the glass substrate evaporated and diffused at different speeds, thereby producing the cloud-like spots.

CONTENTS OF THE INVENTION

The object of the present invention is to provide a method and device for coating with polyimide solution, so as to overcome the defect of spots produced in the display in the prior art.

On one hand, a method for coating with polyimide solution is provided, which comprises the following steps:
placing a glass substrate onto a support surface to form a face contact therebetween;
heating the glass substrate to a preset coating temperature through the support surface; and
coating the glass substrate with the polyimide solution.

Advantageously, the preset coating temperature is lower than the boiling point of the solvent in the polyimide solution.

Advantageously, the preset coating temperature is within the range of 50° C.-110° C.

Advantageously, the mass percentage of the solute in the polyimide solution is less than 20%.

Advantageously, an external surface of a support plate with a built-in infrared heating device or electric heating plate is used as the support surface in the method, and the glass substrate is heated through the support surface by the infrared heating device or electric heating plate.

Advantageously, the method further includes the following step:
after placing the glass substrate onto the support surface, vacuuming the space between the glass substrate and the support surface to make the glass substrate contact with the support surface in vacuum.

Advantageously, the method further includes the following step:
plating the support surface with antistatic material before placing the glass substrate onto the support surface.

Advantageously, the surface of a heating liquid is used as the support surface in the method, through which the glass substrate is heated by the heating liquid.

Accordingly, a device for coating with polyimide solution is also provided, which comprises a support plate for supporting a glass substrate to be coated with the polyimide solution, a heating device for heating the glass substrate is provided in the support plate and some through-holes communicated with a vacuum device are provided in the support plate towards its thickness direction.

Advantageously, the device further includes a pick-and-place groove located at the side of the support plate facing the glass substrate, pick-and-place into which a manipulator inserts to pick/place the glass substrate.

On the other hand, a method for coating with polyimide solution is provided, which comprises the following steps:
placing a glass substrate onto a support plate to form a face contact between the glass substrate and the external surface of the support plate;
vacuuming the space between the glass substrate and the external surface of the support plate through through-holes located in the thickness direction of the support plate with a vacuum device, to make the glass substrate contact with the external surface of the support plate in vacuum;
heating the glass substrate to a preset coating temperature through the external surface of the support plate with a heating device arranged inside the support plate; and
coating the glass substrate with the polyimide solution.

Advantageously, the preset coating temperature is lower than the boiling point of the solvent in the polyimide solution.

Advantageously, the preset coating temperature is within the range of 50° C.-110° C.

Advantageously, the mass percentage of the solute in the polyimide solution is less than 20%.

Advantageously, the method further includes the following step:
plating the external surface of the support plate with antistatic material before placing the glass substrate onto the support plate.

The following beneficial effects can be obtained through implementing the present invention: with the glass substrate heated before being coated, the polyimide solution diffusion and solvent evaporation during coating can be accelerated, which is conducive to controlling the temperature uniformity and consistency and preventing the cloud-like spots. The glass substrate in face contact with the support plate is more conducive to being fully heated, and can prevent the glass substrate from being heated non-uniformly due to the contact of the glass substrate with the supporting legs, thereby preventing the foot-like spots.

BRIEF DESCRIPTION OF THE DRAWINGS

Hereinafter, embodiments of the present invention or the technical solution in the prior art will be more clearly with reference to the accompanying drawings needed in the description of the embodiments or the prior art. Obviously, the drawings below are only some examples of the present invention; the skilled in the art can further obtain other drawings according to these drawings without making any inventive effort.

DETAILED DESCRIPTION OF THE EMBODIMENTS

The technical solution in the embodiments of the present invention will be described below clearly and completely with reference to the drawings of the embodiments of the present invention; obviously, the described embodiments are only part rather than all of the embodiments of the present invention. All other embodiments obtained by those of ordinary skill in the art according to the embodiments of the present invention without making any inventive effort all fall within the scope of protection of the present invention.

Figure 1:
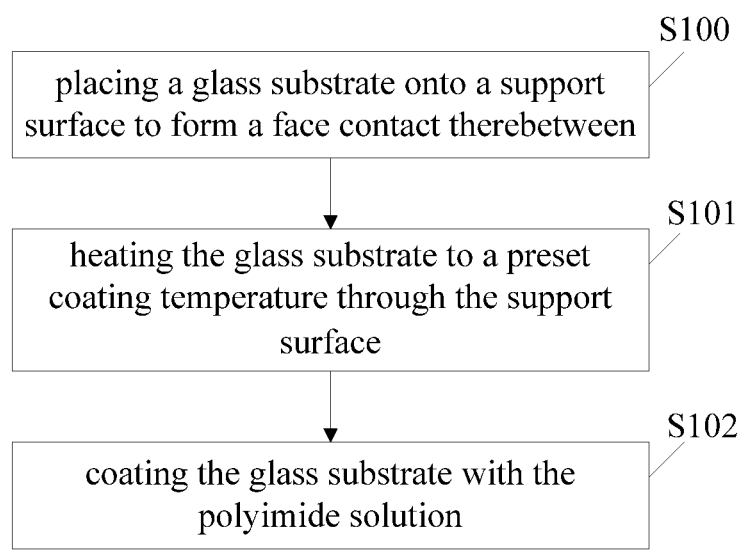
FIG. 1 is a flow chart of the method for coating with polyimide solution according to the first embodiment of the present invention.

FIG. 1 is a flow chart of the method for coating with polyimide solution according to the first embodiment of the present invention, which comprises the following steps:

Step S100: placing a glass substrate onto a support surface to form a face contact therebetween.

Step S101: heating the glass substrate to a preset coating temperature through the support surface.

Step S102: coating the glass substrate with the PI solution.

In the method for coating with the PI solution according to the embodiments of the present invention, with the glass substrate heated before being coated, the PI solution diffusion and solvent evaporation during coating can be accelerated, which is conducive to controlling the temperature uniformity and consistency and preventing the cloud-like spots; the glass substrate in face contact with the support plate can prevent the glass substrate from being heated non-uniformly due to the contact of the glass substrate with the supporting legs, thereby preventing the foot-like spots.

In Step S101, a variety of suitable methods can be used for heating the glass substrate, such as an infrared heating method, a liquid heating method, and an electric heating plate method. For example, an external surface of a support plate with a built-in infrared heating device or electric heating plate is used as the support surface, and the glass substrate is heated through the support surface by the infrared heating device or electric heating plate. The surface of the heating liquid can further be used as the support surface, through which the glass substrate is heated by the heating liquid, Advantageously the heating liquid can be such liquids as the HT solution that have a higher boiling point than the PI solution, a higher density than the glass substrate and do not have a chemical reaction with the glass substrate.

When the liquid heating method is used, the glass substrate is in direct contact with the liquid with rare air and an adsorption force therebetween, so the glass substrate has a relatively stable position and is not easy to move. However, when the infrared heating method or the electric heating plate method is used, if the glass substrate is placed directly on the support plate, the glass substrate is very easy to move, which may also result in non-uniform distribution of the PI solution, thus producing a polyemid having non-uniform thickness, thereby causing the spot defect. A vacuum method can be used for fixing the glass substrate without using a pin. This preferred example will be described below with reference to FIG. 2.

Figure 2:
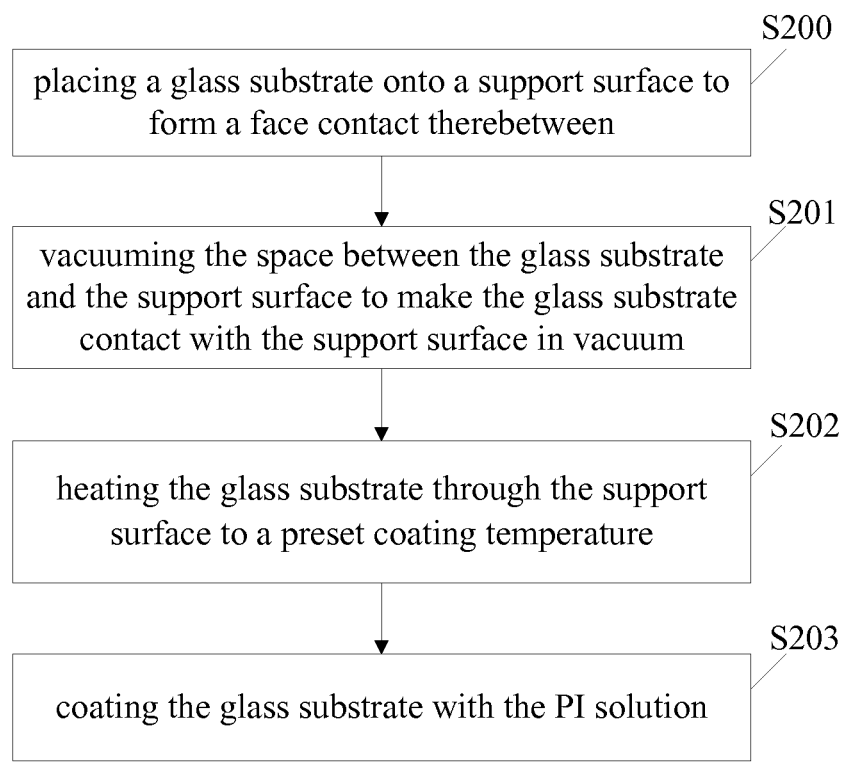
FIG. 2 is a flow chart of the method for coating with polyimide solution according to the second embodiment of the present invention.

FIG. 2 is a flow chart of the method for coating with polyimide solution according to the second embodiment of the present invention, which comprises the following steps:

Step S200: placing a glass substrate onto a support surface to form a face contact therebetween.

Step S201: vacuuming the space between the glass substrate and the support surface to make the glass substrate contact with the support surface in vacuum.

Step S202: heating the glass substrate through the support surface to a preset coating temperature.

Step S203: coating the glass substrate with the PI solution.

Figure 3:
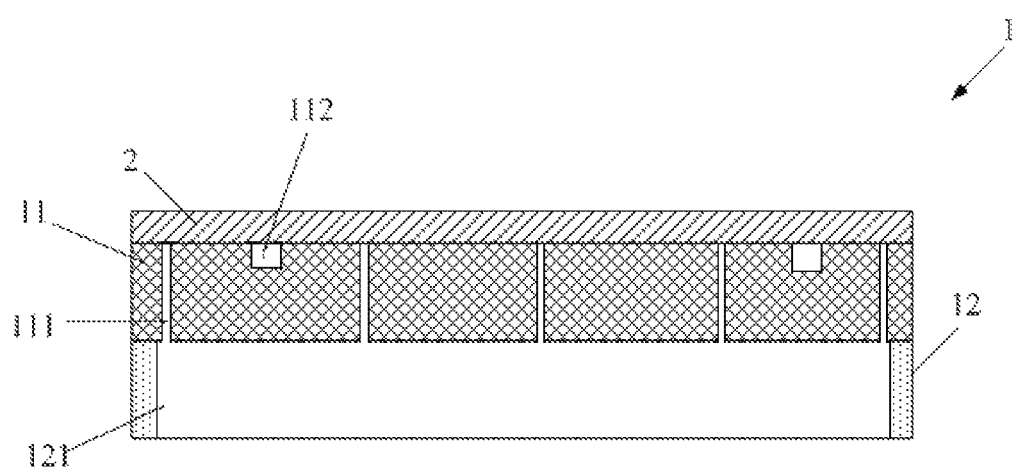
FIG. 3 is a schematic diagram of the structure of the device for coating with polyimide according to an embodiment of the present invention.

The method as shown in FIG. 2 can be used in the device as shown in FIG. 3. FIG. 3 is a schematic diagram of the structure of the device 1 for coating with the PI solution according to an embodiment of the present invention. The device 1 for coating with the PI solution comprises a support plate 11 for supporting the glass substrate to be coated with the PI solution, the support plate 11 is provided with a heating device for heating the glass substrate 2 (not shown in the diagram) and some through-holes 111 connected to a vacuum device (no shown in the diagram) in its thickness direction. Preferably, the support plate 11 is provided with an exhaust pipe 12 at a side away from the glass substrate 2, and provided inside with a cavity 121 connected to the vacuum device (no shown in the diagram), the through-holes 111 of the support plate 11 is communicated with the cavity 121 of the exhaust pipe 12.

In the working process device 1 for coating with the PI solution, a glass substrate 2 is first placed on a support plate 11 to form a face contact between the glass substrate 2 and the external surface of the support plate 11; then the space between the glass substrate 2 and the external surface of the support plate 11 is vacuumed by a vacuum device through the through-holes 111 located in the thickness direction of the support plate 11, to make the glass substrate 2 contact with the external surface of the support plate 11 in vacuum; and then the glass substrate 2 is heated by the heating device arranged in the support plate 11 through the external surface of the support plate 11, making the glass substrate 2 reach a preset coating temperature; and finally the polyimide solution is coated onto the glass substrate 2.

Specifically, in Step S201, the cavity 121 of the exhaust pipe 12 is vacuumed by the vacuum device; because the through-holes 111 through the support plate 11 are communicated with the cavity 121 of the exhaust pipe 12, the glass substrate 2 is adsorbed on the upper surface of the support plate 11. After Step S203 is completed and the polyemid is formed, air is blown into the cavity 121 of the exhaust pipe 12 by the vacuum device, so as to increase the air pressure inside the cavity 121, such that the glass substrate 2 is released with the air flowing through the through-holes 111 of the support plate 11.

Preferably, the device 1 shown in FIG. 3 can also include a pick-and-place groove 112, which is arranged at the side of the support plate 11 facing the glass substrate 2 and operable to allow a manipulator insert therein to pick/place the glass substrate 2. Returning to FIG. 2, in Step S200, a manipulator is used to clamp the glass substrate 2, some of the fingers of the manipulator are inserted into the pick-and-place groove 112 so as to placing the glass substrate 2 stably onto the support plate 11; after Step S203, after air is blown into the cavity 121 of the exhaust pipe 12, some of the fingers of the manipulator are inserted into the pick-and-place groove 112 to clamp the glass substrate 2, so as to taking out the glass substrate 2 stably.

Preferably, in the embodiment shown in FIG. 2, the method can further include the following step before Step S200: plating the support surface with antistatic material before placing the glass substrate onto the support surface. For example, the support surface can be plated with fluorine, so as to reduce the electrostatic hazards that may be caused by the glass substrate.

Preferably, in the embodiment shown in FIG. 3, the preset coating temperature is lower than the boiling point of the solvent in the PI solution, which can prevent the solvent in the PI solution from being evaporated too fast, thus preventing the PI solution from being evaporated up before complete diffusion of the solvent. Specifically, the preset coating temperature can be within the range of 50° C.-110° C.

Preferably, in the embodiment shown in FIG. 3, for preventing the PI solution from being evaporated up before complete diffusion of the solvent, the mass percentage of the solute (i.e. the PI solid used for preparing the PI solution) in the PI solution can also be less than 20%. Usually, the PI solution includes a solute (i.e. the PI solid) and a solvent, wherein the solvent may be dimethylamine, N-methyl pyrrolidone or butyl carbonate. Before coating, the common PI solution can be diluted, i.e. reducing the content of the solute or increasing the content of the solvent in the PI solution, so as to greatly increase fluidity of the PI solution, accelerate diffusion, and also make the diffusion more uniform.

Preferably, in the embodiment shown in FIG. 3, the device for coating with the PI solution can also be placed in a sealed vacuum chamber, which can accelerate the heating of the glass substrate, and meanwhile save energy and time and improve the yield.

The disclosure above is only one preferred example of the present invention, which cannot certainly be used to limit the scope of protection of the present invention. Those of ordinary skill in the art can understand all or part of the processes of the above example, and make equivalent changes according to the claims of the present invention, which still fall within the scope of the present invention.

The invention claimed is:

1. A method for coating with a polyimide solution, comprising the following steps:
    placing a glass substrate onto a support surface to form a face contact therebetween;
    heating the glass substrate to a preset coating temperature through the support surface; and
    coating the glass substrate with the polyimide solution;
    wherein, the mass percentage of a solute in the polyimide solution is larger than 0% and less than 20%; and
    wherein, a surface of a heating liquid is used as the support surface to directly contact with the glass substrate, and the heating liquid is used to heat the glass substrate via the surface of the heating liquid.

2. The method of claim 1, wherein, the preset coating temperature is lower than the boiling point of a solvent in the polyimide solution.

3. The method of claim 2, wherein, the preset coating temperature is within the range of 50° C. –110° C.

4. The method of claim 3, wherein, the method further includes the following step:
    plating the support surface with antistatic material before placing the glass substrate onto the support surface.

5. The method of claim 1, wherein, an external surface of a support plate with a built-in infrared heating device or electric heating plate is used as the support surface in the method, and the glass substrate is heated through the support surface by the infrared heating device or electric heating plate.

6. The method of claim 5, wherein, the method further includes the following step:
    after placing the glass substrate onto the support surface, vacuuming the space between the glass substrate and the support surface to make the glass substrate contact with the support surface in vacuum.

7. A method for coating with a polyimide solution, comprising the following steps:
    placing a glass substrate onto a support plate to form a face contact between the glass substrate and the external surface of the support plate;
    vacuuming the space between the glass substrate and the external surface of the support plate through through-holes located in the thickness direction of the support plate with a vacuum device, to make the glass substrate contact with the external surface of the support plate in vacuum;
    heating the glass substrate to a preset coating temperature through the external surface of the support plate with a heating device arranged inside the support plate; and
    coating the glass substrate with the polyimide solution;
    wherein, the mass percentage of a solute in the polyimide solution is larger than 0% and less than 20%.

8. The method of claim 7, wherein, the preset coating temperature is lower than the boiling point of a solvent in the polyimide solution.

9. The method of claim 8, wherein, the preset coating temperature is within the range of 50° C.-110° C.

10. The method of claim 7, wherein, the method further includes the following step:
    plating the external surface of the support plate with antistatic material before placing the glass substrate onto the support plate.

* * * * *